US006816493B2

United States Patent
Shi et al.

(10) Patent No.: US 6,816,493 B2
(45) Date of Patent: Nov. 9, 2004

(54) METHOD AND APPARATUS EMPLOYING A MEDIATION DEVICE TO FACILITATE COMMUNICATION AMONG DEVICES IN AN ASYNCHRONOUS COMMUNICATIONS NETWORK

(75) Inventors: Qicai Shi, Coral Springs, FL (US); Jian Huang, Coral Springs, FL (US); Edgar H. Callaway, Jr., Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 222 days.

(21) Appl. No.: 09/803,322

(22) Filed: Mar. 9, 2001

(65) Prior Publication Data

US 2002/0126627 A1 Sep. 12, 2002

(51) Int. Cl.[7] .............................................. H04L 12/28
(52) U.S. Cl. .................... 370/395.4; 370/235; 370/311; 709/202
(58) Field of Search ............................. 370/236.1, 310, 370/311, 313, 342, 344, 349, 350, 389, 395.1, 395.2, 395.21, 395.4, 428, 429; 455/412, 500, 507, 514, 515, 517, 522; 379/67.1, 88.12; 340/7.23, 7.32, 7.35, 7.36, 7.38

(56) References Cited

U.S. PATENT DOCUMENTS

| | | | | | |
|---|---|---|---|---|---|
| 4,313,036 | A | * | 1/1982 | Jabara et al. ................ 370/352 |
| 5,128,938 | A | * | 7/1992 | Borras ....................... 340/7.28 |
| 5,241,542 | A | * | 8/1993 | Natarajan et al. .......... 340/7.34 |
| 5,278,831 | A | * | 1/1994 | Mabey et al. ............... 340/7.35 |
| 5,371,734 | A | * | 12/1994 | Fischer ....................... 370/311 |
| 5,418,835 | A | * | 5/1995 | Frohman et al. ............ 340/7.22 |
| 5,533,100 | A | * | 7/1996 | Bass et al. ............. 379/209.01 |
| 5,590,396 | A | * | 12/1996 | Henry ........................ 340/7.38 |
| 5,778,052 | A | * | 7/1998 | Rubin et al. ............ 379/207.03 |
| 5,797,094 | A | * | 8/1998 | Houde et al. ............... 340/7.38 |
| 5,845,204 | A | * | 12/1998 | Chapman et al. ............ 370/311 |
| 5,940,771 | A | * | 8/1999 | Gollnick et al. ............. 370/311 |
| 5,943,397 | A | * | 8/1999 | Gabin et al. ................. 379/67.1 |
| 5,991,287 | A | * | 11/1999 | Diepstraten et al. ........ 370/338 |
| 6,044,069 | A | * | 3/2000 | Wan ........................... 340/7.34 |
| 6,047,200 | A | * | 4/2000 | Gibbons et al. ............. 370/311 |
| 6,058,289 | A | * | 5/2000 | Gardner et al. ............. 340/7.32 |
| 6,138,019 | A | * | 10/2000 | Trompower et al. ......... 455/432 |
| 6,192,230 | B1 | * | 2/2001 | van Bokhorst et al. ..... 370/311 |
| 6,259,772 | B1 | * | 7/2001 | Stephens et al. .......... 379/88.11 |
| 6,285,892 | B1 | * | 9/2001 | Hulyalkar ................... 340/7.32 |
| 6,351,522 | B1 | * | 2/2002 | Vitikainen .................. 379/67.1 |
| 6,356,538 | B1 | * | 3/2002 | Li ............................... 370/311 |

\* cited by examiner

Primary Examiner—Hassan Kizou
Assistant Examiner—David Odland
(74) Attorney, Agent, or Firm—Kenneth A. Haas

(57) ABSTRACT

A low power consumption protocol for low power communication devices attached to an asynchronous network is described. In this protocol, a communication device is used as a high communication duty cycle Mediation Device (MD), thus permitting other communication devices to use a low communication duty cycle framing structure. The MD functions as a storage and retrieval service for messages between two devices when one device is not able to communicate. When the previously unavailable device becomes available, it can check in with the MD to retrieve any missed messages and respond to these messages accordingly. In a communication network, each of the low power communication devices can be configured to behave as MD's for a small amount of time. Sharing this responsibility among all communication devices in the network allows each device to maintain an low average communication duty cycle. This technique is applicable to a low power, low cost, zero-configuring, self-organizing, asynchronous network.

23 Claims, 12 Drawing Sheets

—PRIOR ART—

—PRIOR ART—

METHOD AND APPARATUS EMPLOYING A MEDIATION DEVICE TO FACILITATE COMMUNICATION AMONG DEVICES IN AN ASYNCHRONOUS COMMUNICATIONS NETWORK

CROSS REFERENCE TO RELATED APPLICATION

This application is related to the applications entitled "System for Spread Spectrum Communication" Ser. No. 09/803,253, "A Protocol for a Self-Organizing Network Using a Logical Spanning Tree Backbone" Ser. No. 09/803,259, and "System for Code Division Multi-Access Communication" Ser. No. 09/803,285 all filed on the same date as the present invention.

FIELD OF THE INVENTION

The present invention relates generally to communication networks and more specifically to the use of multiple access protocols in asynchronous communication networks.

BACKGROUND OF THE INVENTION

In communication networks, asynchronous transmission of information is often the technique used when communicating information between one or more communication devices within a communication network. Asynchronous transmission is often used when low power devices make up the network. These low power devices can use a low communication duty cycle frame structure in order to minimize the amount of power used while not actively communicating with other network devices, but the use of a low communication duty cycle frame structure often implies that device availability is reduced. In wireless communication networks, a fundamental challenge is maintaining high availability communications while using low power wireless communication devices.

The neuRFon™ device by Motorola is an example of a low power, low cost, small size, and simple wireless device. The neuRFon™ device network is a zero-configuring, self-organizing, asynchronous network containing multiple neuRFon™ devices. For this network, power consumption and cost are two major concerns.

To lower the power consumption, the average communication duty cycle of all the devices in the described network has to be decreased to a minimum. The average communication duty cycle refers to the fraction of time that the wireless device is able to send and receive messages. For the described asynchronous network, the average communication duty cycle may be set so low that the infrequent communications between a transmitter and a destined receiver become a problem. For example, device A may attempt to contact device B, but device B may be not be able to receive messages due to its low average communication duty cycle. This will prevent device A from establishing contact.

A representative low average communication duty cycle frame structure, in which the above problem is illustrated, is shown in FIG. 1. Using this frame structure, a low average communication duty cycle device uses 1 ms to warm up, 1 ms to transmit and receive messages from other devices in its group, and is asleep for the remaining 998 ms of the 1 second cycle. This gives a communication duty cycle of about 0.1%, which is very power efficient.

The problem with this approach is illustrated in FIG. 2. FIG. 2 shows a small network comprising several low power, low average communication duty cycle devices, where each device is represented as a small dot. Referring again to FIG. 2, device A tries to talk to device B. If the low average communication duty cycle frame structure in FIG. 1 is assumed, both A and B devices are able to communicate only 0.1% of the time. If we further make the reasonable assumption that device A and device B don't each have access to the other's time schedule, the probability of device A to establish communication with device B is approximately 0.1%, which is too small for most applications.

To reduce the cost, low cost crystal and/or Micro Electro-Mechanical Systems (MEMS) may be utilized as the frequency generator for the wireless device. The issue with these technologies is their inherent poor frequency stability that further makes synchronization difficult. Removing the requirement for highly accurate frequency synchronization would allow the cost of such devices to be kept low. Such a protocol would enable asynchronous networks employing these low power, low communication duty cycle devices to be built at low cost and low power consumption.

An invention that introduces a new protocol enabling low power, low communication duty cycle devices to communicate with each other, while at the same time not requiring highly accurate frequency synchronization would be able to address the issues described above.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
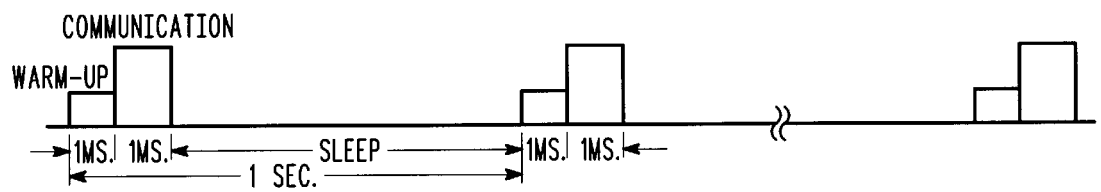
FIG. 1 is a low communication duty cycle frame structure, according to the prior art.
Figure 2:
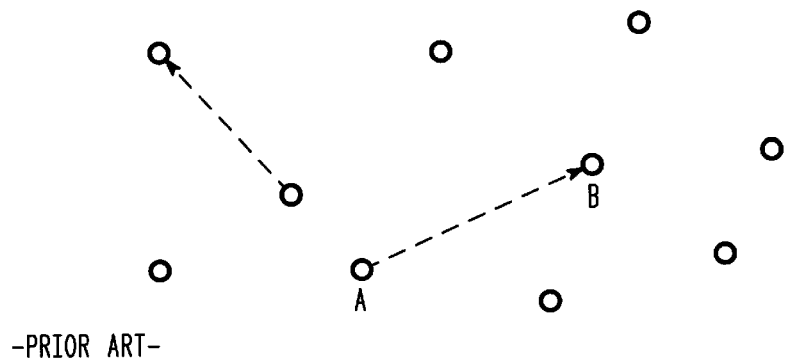
FIG. 2 is a low power communication device network, according to the prior art.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 3:
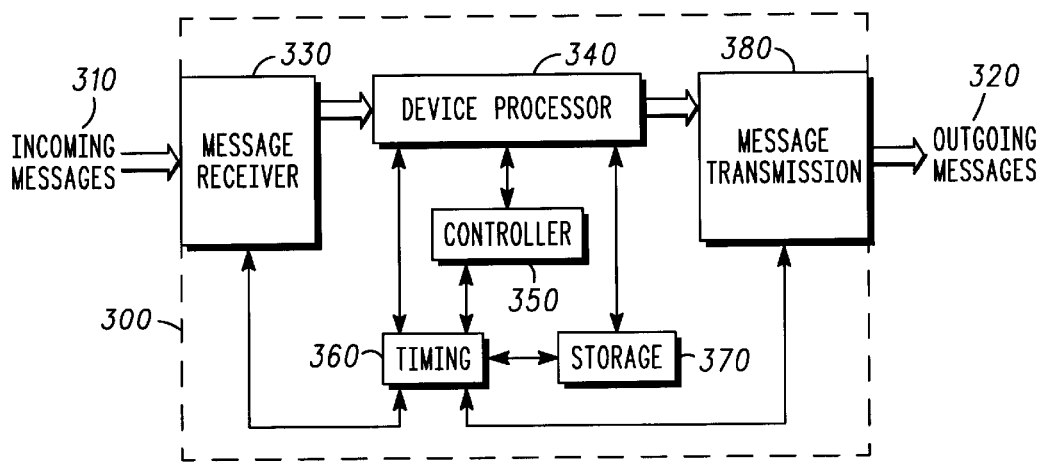
FIG. 3 is a block diagram illustrating the internal functionality of a low power device, according to the present invention.

Therefore, according to the present invention, a multiple access protocol and structure for communication devices in an asynchronous network is described. This multiple access protocol is applied to the situation in which there are multiple low power communication devices in an asynchronous communication network. These low power communication devices may be neuRFon™ devices, or any similar device capable of low power, low communication duty cycle, and low cost information transmission. Referring now to FIG. 3, a system level block diagram 300 of the internal operation of a low power communication device is shown. Incoming messages 310 are received by a message receiver 330 of the communication device, and are prepared for processing by device processor 340. Device processor 340 interacts with a controller 350, timing 360, and storage 370 in order to allow the communication device to receive and process incoming messages 310 from other communication devices in the network. The timing block 360 allows for synchronization between the communication device and other communication devices in the network, as well as providing a timing reference for internal device functionality. Device transmitter 380 receives messages from device processor 340, prepares messages for transmission, and transmits outgoing messages 320 to other communication devices in the network. One will recognize that the functional blocks illustrated in the system level block diagram 300 of FIG. 3 may be modified or combined without departing from the spirit and scope of a low power communication device that sends messages, receives messages, and processes messages.

In order to keep the power consumption at a minimum, and yet still achieve reliable communication, a mediation device (MD) is introduced. The MD acts as a mediator between communication devices within the network, and is capable of recording and playing back message related information. This is most useful when two communication devices are unable to establish contact. More than one MD may also be used in a large network, where each MD mediates for a group of low-power, low communication duty cycle communication devices. The MD has a relatively high communication duty cycle as compared to the low-power communication devices in the group and is thus able to store and forward messages between two or more low power communication devices in the asynchronous network. Note that the MD functionality may actually be a feature of the low power communication devices in the group. In this case, each low power communication device may be operable as a MD within the asynchronous network, with a low power communication device of the network being randomly chosen to temporarily operate as a MD of the group. This allows the overall network to remain a low power, low cost asynchronous network and each low power wireless device to remain a low communication duty cycle device, except when serving as a MD. Since a low power wireless device is a MD only occasionally, the average communication duty cycle of each low power wireless device can remain low. Distributing MD functionality across all the communication devices in the network also allows the communication devices to use energy mining in order to increase the average communication duty cycle of the communication devices in the network.

During normal asynchronous network operation, each communication device except those serving as MD has a low communication duty cycle frame structure. The communication duty cycle of the MD may be adapted to the design parameters of the network, so that changing the parameters of the MD has an impact on the availability of each communication device within communication range of the MD.

Figure 4:
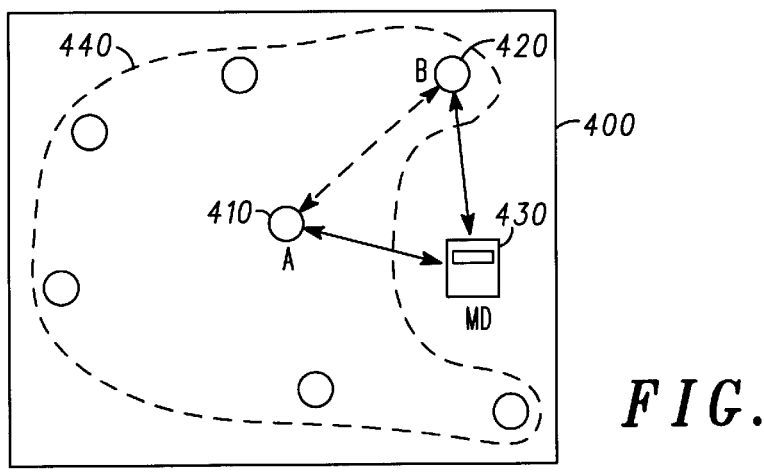
FIG. 4 is a network containing multiple low power devices and a single dedicated Mediation Device (MD), according to a first embodiment of the present invention.

The present invention discloses a method and structure for a low power consumption protocol for low power wireless devices attached to an asynchronous network. Referring to FIG. 4, a simplified representation of a network 400 containing a plethora 440 of low power communication devices 410 and a dedicated MD 430 is shown, according to a first embodiment of the present invention. Each of the low power communication devices 410 of network 400 has a low communication duty cycle and must therefore rely upon dedicated MD 430 for reliable communication. Dedicated MD 430 has a high communication duty cycle in comparison to the non-MD low power devices 410, and can store messages destined for any of low power wireless devices 410 within the group 440.

Figure 5:
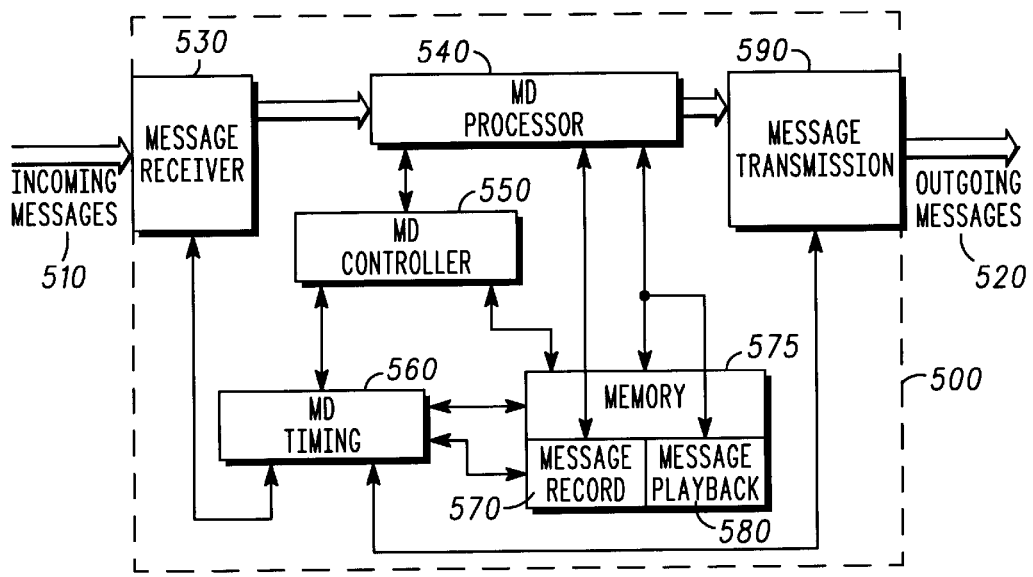
FIG. 5 illustrates the internal functionality of a dedicated MD, according to the first embodiment of the present invention.

Referring now to FIG. 5, a system level block diagram 500 of the internal operation of a dedicated MD device 430 is shown. The dedicated MD device 430 is capable of sending and receiving several types of messages, including the source communication device id, the destination communication device id, the message, time of desired communication, message replay requests, control words, and device status messages. Incoming messages 510 are received by a MD message receiver 530 of the dedicated MD device 430, and are prepared for processing by device processor 540. MD Device processor 540 interacts with a controller 550, timing 560, and storage 575 in order to allow the MD 430 to receive, store, replay and process incoming messages 510 from other communication devices in the network. In addition to non-specific memory, the storage block 575 also includes message playback 580 and message record 570 memory, so that MD processor 540 can mediate requests from communication devices within the network to record messages, playback messages, and save communication device contact information. The timing block 560 allows for synchronization between the MD 430 and other communication devices in the network, as well as provides a timing reference for internal device functionality. Device transmitter 590 receives messages from device processor 540, prepares messages for transmission, and transmits outgoing messages 520 to other communication devices in the network. One skilled in the art will recognize that the functional blocks illustrated in the system level block diagram 500 of FIG. 5 may be modified or combined without departing from the spirit and scope of a low power communication device that sends messages, receives messages, and processes messages.

Figure 6:
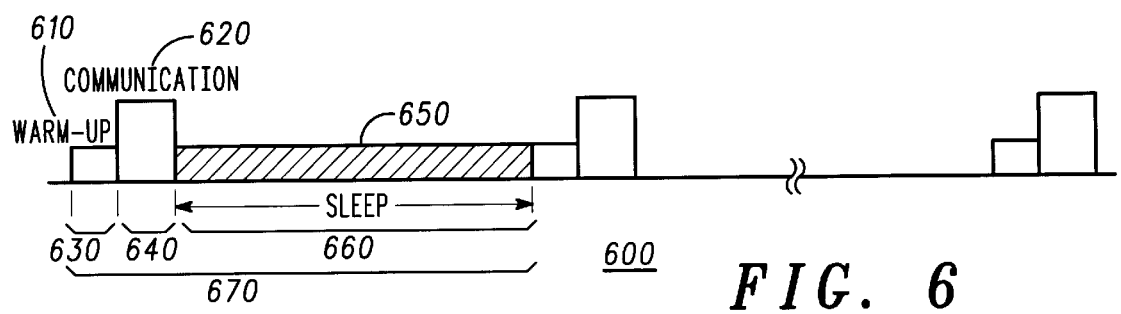
FIG. 6 is a low communication duty cycle frame structure for a low power device, according to the present invention.

Referring now to FIG. 6, a representative low communication duty cycle frame structure 600 characteristic of the low power, low communication duty cycle devices of the network is shown. A single frame 670 of low communication duty cycle frame structure 600 contains a warm-up block 610, a communication block 620, and a sleep block 650. Warm-up block 610 occurs first chronologically, and is a very small percentage of the overall frame duration. Warm-up block 610 is followed by communication block 620. Communication block 620 is also a small percentage of the overall frame duration. After communication block 620 ends, sleep block 650 begins. Sleep block 650 is a relatively high percentage of the overall frame duration in order to preserve the low communication duty-cycle characteristic of the device. Exemplary values are 1 ms for warm-up block 610, 1 ms for communication block 620, and 998 ms for sleep block 650, although these values can be changed significantly without departing from the invention. At the end of frame 670, the three-block cycle 610, 620, 650 is repeated for the next frame. This block order is preserved for all frames in the low communication duty cycle frame structure 400. In the preferred first embodiment, communication block 620 may be further subdivided into a transmit period and a receive period, although it will be clear to one of skill in the art that the communication devices in the network can have multiple transmit and receive periods within communication block 620. Under normal operation of the first preferred embodiment, the receive period occurs first, followed by a transmit period of equal duration. Under certain situations, such as synchronization between communication devices, the transmit period may occur before the receive period.

Figure 7:
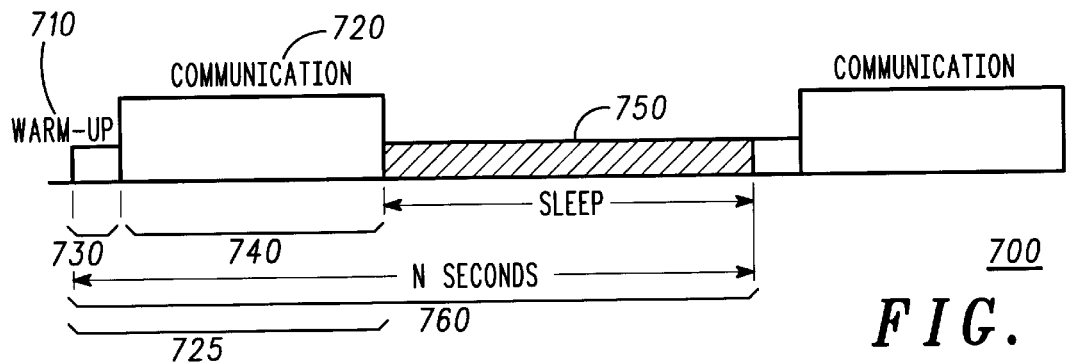
FIG. 7 is a high communication duty cycle frame structure for a dedicated MD, according to the first embodiment of the present invention.

Referring now to FIG. 7, a representative high communication duty cycle frame structure 700 is shown. This high communication duty cycle frame 700 is representative of the dedicated MD communication duty cycle frame, according to the first embodiment. A single frame 725 of low communication duty cycle frame structure 700 contains a warm-up block 710 and a communication block 720. Warm-up block 710 occurs first chronologically, and is a very small percentage of the overall frame duration. Warm-up block 710 is followed by communication block 720. Communication block 720 is a relatively very large percentage of the overall frame duration. At the end of frame 725, sleep cycle 750 begins, which can last for several frames. Exemplary values are 1 ms for warm-up block 710, 2 seconds for communication block 720, and 100 seconds for sleep cycle 750. At the end of sleep cycle 750, warm-up block 710 and communication block 720 are repeated for the next frame. This block order is preserved for all frames in the high communication duty cycle frame structure 700. In the preferred first embodiment, communication block 720 may be further subdivided into a transmit period and a receive period, although it will be clear to one of ordinary skill in the art that the communication devices in the network can have multiple transmit and receive periods within communication block 720. Under normal operation of the first preferred embodiment, the receive period occurs first, followed by the transmit period of equal duration. It should also be noted that the length of the transmit period of communication block 720 should be long enough for the high communication duty cycle device to receive two complete transmit cycles of a low duty cycle device. This will ensure that a dedicated MD will be able to receive a transmission from any communication device within communication range.

Figure 8:
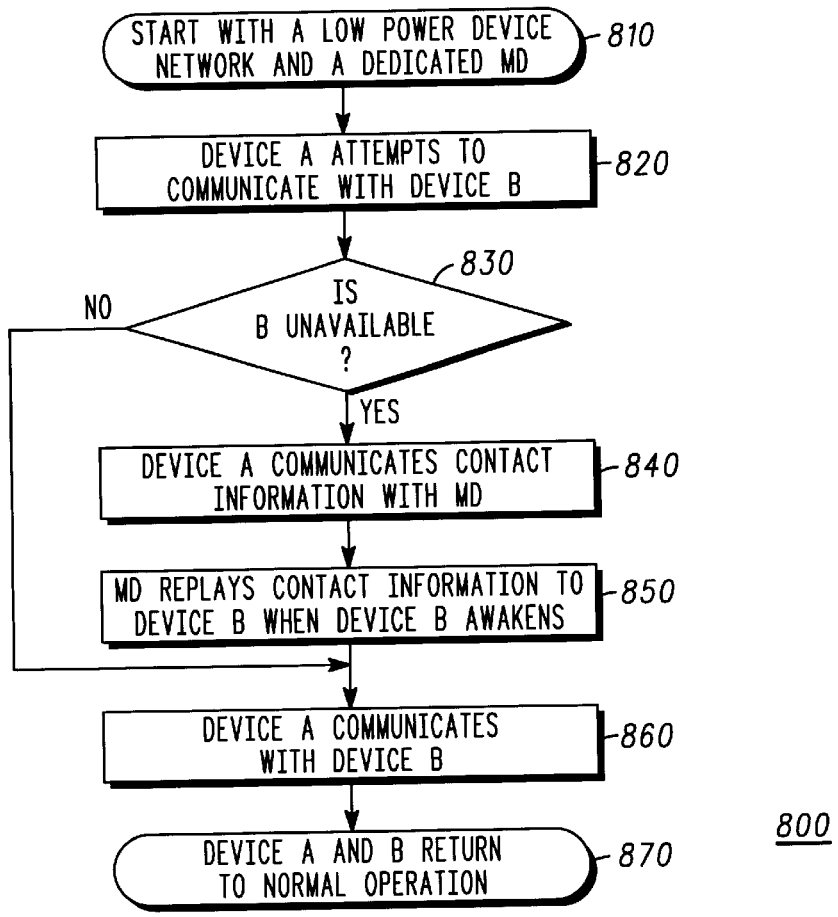
FIG. 8 is a flowchart for dedicated MD operation, according to the first embodiment of the present invention.

Referring now to FIG. 8, a flow diagram 800 for applying the dedicated MD to communication between a communication device A, and a communication device B, according to the first preferred embodiment, is shown. In block 820, device A attempts to communicate with device B. If B is reachable, then decision block 830 evaluates to No and device A establishes communications with device B as shown in block 860. Device A and device B then return to normal operation, as shown in termination block 870. If the answer in decision block 830 is Yes, then device B is not available, and device A communicates contact information with the dedicated MD as shown in block 840. In block 850, dedicated MD replays the contact information for device B when device B is able to communicate. Device B uses this contact information to synchronize communications with device A. Device A is now able to communicate with device B, as shown in block 860. After device A communicates with device B, both devices return to normal operation, as shown in block 870. Note that device A can fail to reach device B when device B is in sleep mode, in transmit mode, out of range, or other similar reasons.

Figure 9:
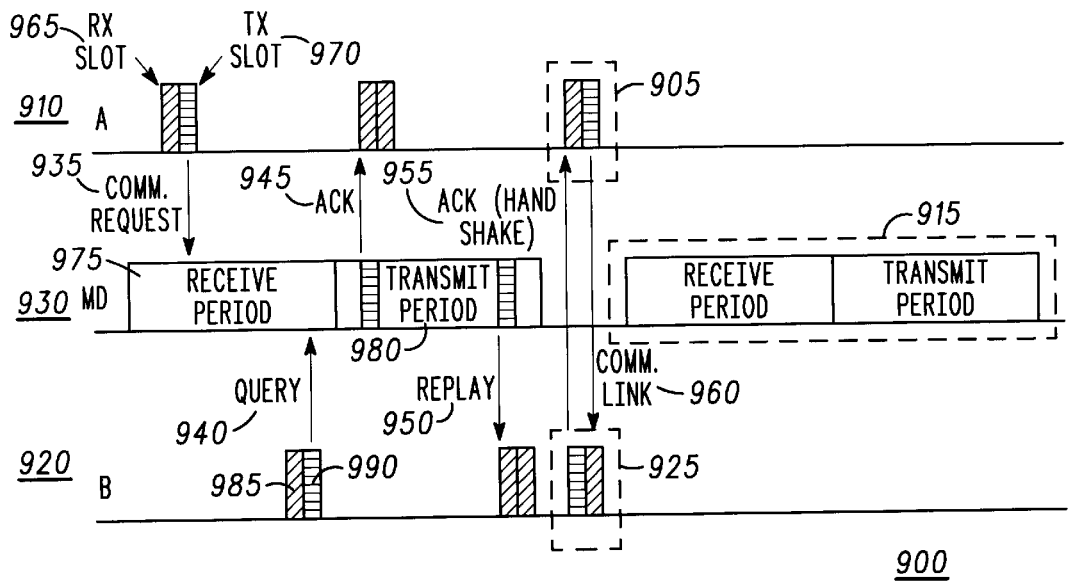
FIG. 9 is a timing diagram for communication between two low power devices and a dedicated MD when a query occurs later than the communication request, according to the first embodiment of the present invention.
Figure 10:
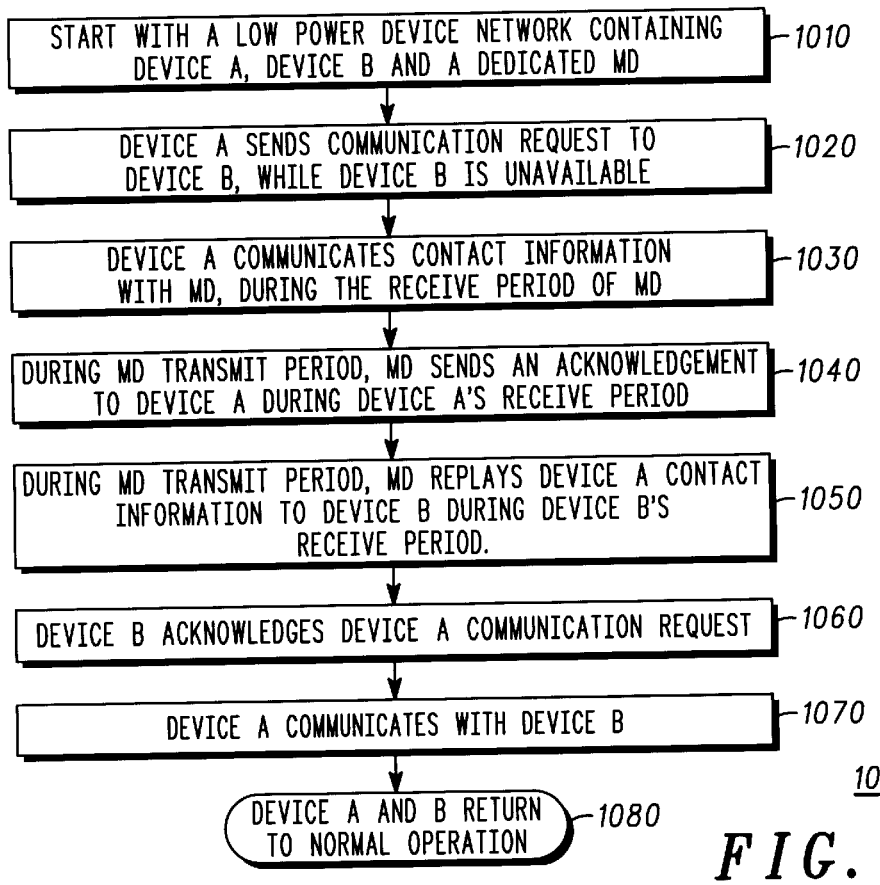
FIG. 10 is a flowchart for communication between two low power devices and a dedicated MD when the query occurs later than the communication request, according to the first embodiment of the present invention.

Referring now to FIG. 9, a more detailed timing diagram is shown for the case described in FIG. 8, according to the first embodiment. As in FIG. 8, device A 910 attempts to communicate with device B 920, but is not successful, so dedicated MD 930 is used to mediate between device A 910 and device B 920 until device B 920 is able to communicate. Device A 910 is a low duty cycle device with a communication period containing a receive slot 965 and a transmit slot 970. Device B 920 is also a low duty cycle device with a communication period containing receive slot 985 and transmit slot 990. Dedicated MD 930 contains a communication period that is much longer than either communication period of device A 910 or device B 920. The communication period of dedicated MD 930 similarly contains a receive period 975 and a transmit period 980. Referring also to FIG. 10, the flowchart for the timing diagram of FIG. 9 is shown. The flow in block 1020 of FIG. 10, as well as the timing diagram of FIG. 9, assume that device A 910 has not been successful in communicating directly with device B 920. So, there is a need for device A 910 to use the dedicated MD 930 to store a communication request with device B 920. As shown in block 1030, device A 910 sends a communication request 935 to dedicated MD 930 during the transmit slot 970 of the communication period of device A 910. Communication request 935 is received by dedicated MD 930 during the receive slot 975 of the communication period of dedicated MD 930. Also during the receive period 975, device B 920 enters its communication period. Upon waking, device B 920 sends a query 940 using transmit slot 990 to dedicated MD 930 to check for messages. Note that both device A 910 and device B 920 are able to communicate with dedicated MD 930 during a single receive slot 975. The duration of receive slot 975 and transmit slot 980 of dedicated MD 930 should be chosen large enough that dedicated MD 930 is able to receive both communication request and query messages. Since MD 930 received communication request 935 from device A 910 prior to the query 940 from device B 920, during the transmission slot 980 of the communication period of dedicated MD 930 dedicated MD 930 first sends an acknowledgement 945 to device A 910 during receive slot 965 in the next communication period of device A 910, as indicated in block 1040. Dedicated MD 930 then sends a replay message 950 to device B 920 during the same transmit slot 980 of the communication period of dedicated MD 930, as indicated in block 1050. In the first preferred embodiment, the communication period of each communication device in the network occurs with a fixed period, so that dedicated MD 930 is able to sync with device B 920 without device B 920 sending synchronization information. However, other implementations of the second embodiment could require each communication device in the network to transmit explicit synchronization information to dedicated MD 930, so that the query message would contain synchronization information. Device B 920 now has enough information to enable communications with device A 910 without the use of dedicated MD 930. In order to synchronize with device A, device B uses timing information provided in the communication request 935 of device A 910, and swaps communication slots so that the transmit slot 990 precedes the receive slot 985 of device B 920. As shown in block 1060, device B 920 then sends an acknowledgement 955 to device A during the receive slot 965 of the communication period of device A. As shown in block 1070, device A 910 is now able to communicate a message 960 to device B 920 during the transmit slot 970 of device A 910 and the receive slot 985 of device B 920. Once the communication between device A 910 and device B 920 is complete, device A 910 and device B 920 return to normal operation, as shown in block 1080.

Figure 11:
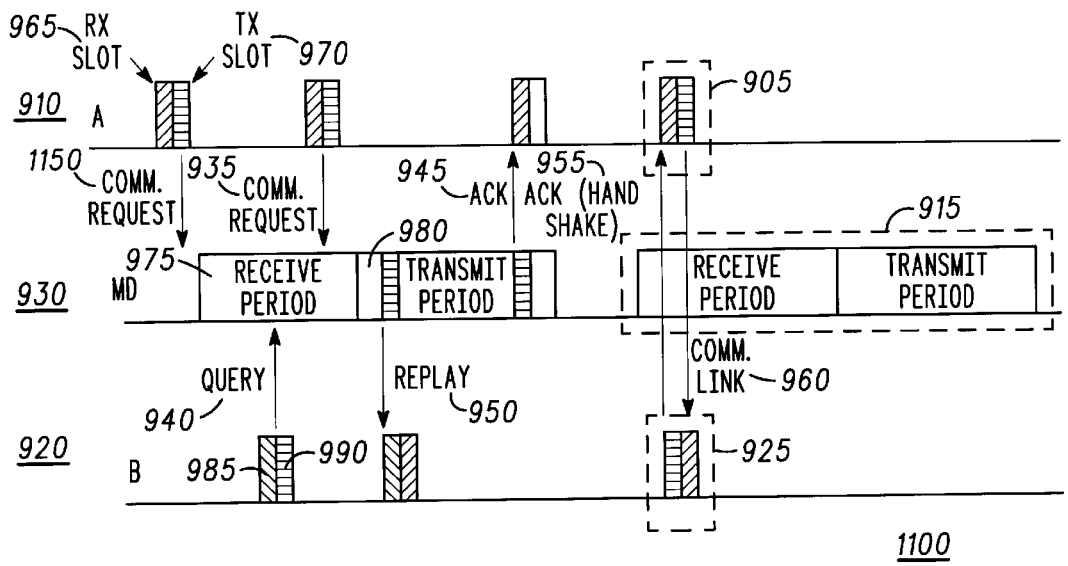
FIG. 11 is a timing diagram for communication between two low power devices and a dedicated MD when the query occurs earlier than the communication request, according to the first embodiment of the present invention.
Figure 12:
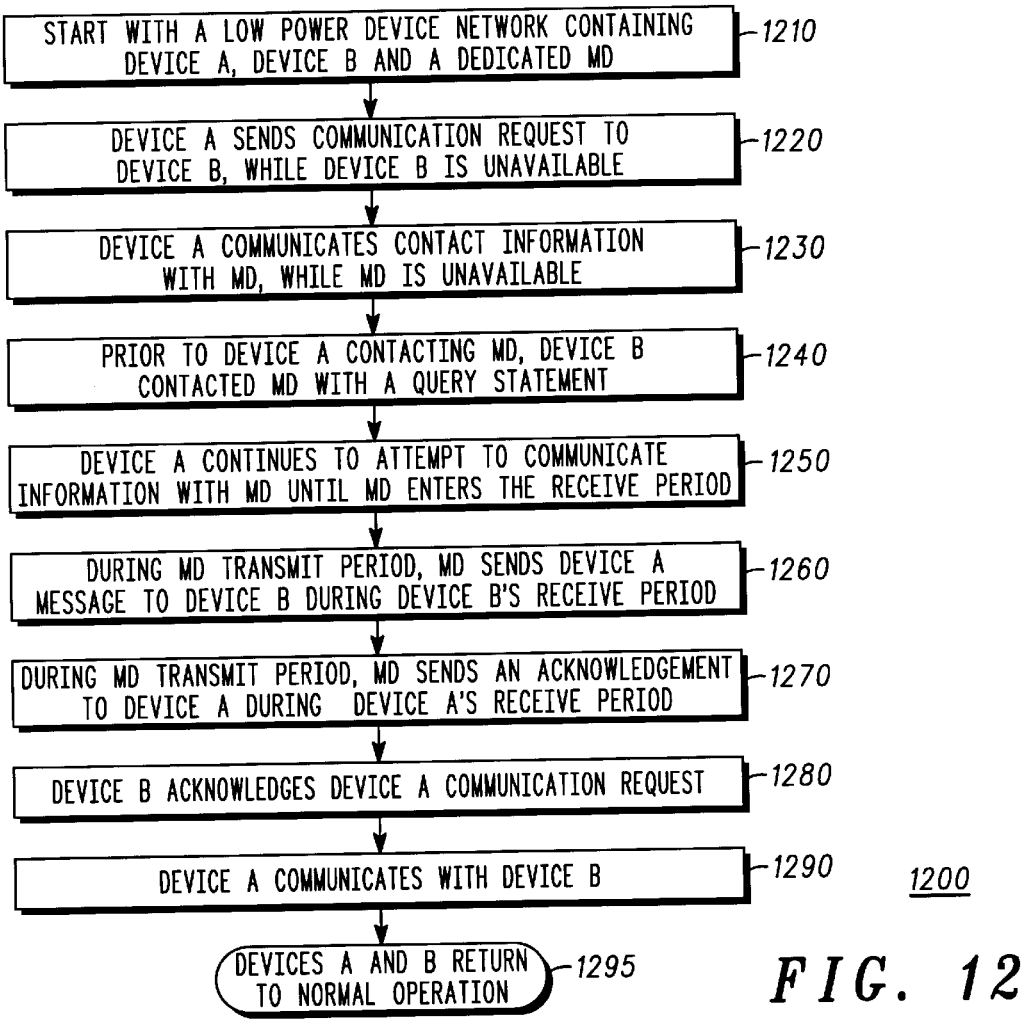
FIG. 12 is a flowchart for communication between two low power devices and a dedicated MD when the query occurs earlier than the communication request, according to the first embodiment of the present invention.

The discussion above referring to FIG. 9 and FIG. 10, illustrated the sequence of communication operations and timing flow for the case in which the query from device B 920 is later than the communication request from device A 910. It is also possible for the query of device B 920 to precede the communication request of device A 910. This scenario is illustrated in the timing diagram of FIG. 11, and the flowchart of FIG. 12. The sequence of operations shown in FIG. 12 is identical to those in FIG. 9, except that device A 910 first attempts to communicate a communication request 1150 with dedicated MD 930 during a time that dedicated MD 930 is unavailable, as in block 1230. Since the dedicated MD 930 is not available, device A 910 has to wait until a communication period in which dedicated MD 930 has an active receive period 975. This delay means that device B 920 sends query 940 to the receive slot 975 of dedicated MD 930 prior to the communication request 935 of device A 910, as in block 1240. It is important to note that since both the transmit slot 975 and receive slot 980 of dedicated MD 930 are as long as two transmit periods of device A 910 or device B 920, during the transmit slot of dedicated MD 930, dedicated MD is able to replay message 950 to device B 920 and acknowledge 945 device A 910. This allows the handshake between device A 910 and device B 920 to proceed as in block 1060-1080. So, the ordering of the communication request 935 and the query 940 within a single receive slot 975 and the ordering of replay 950 and acknowledgement 945 within a single transmit slot 980 of dedicated MD 930 does not affect establishment of communications between device A 910 and device B 920.

Figure 13:
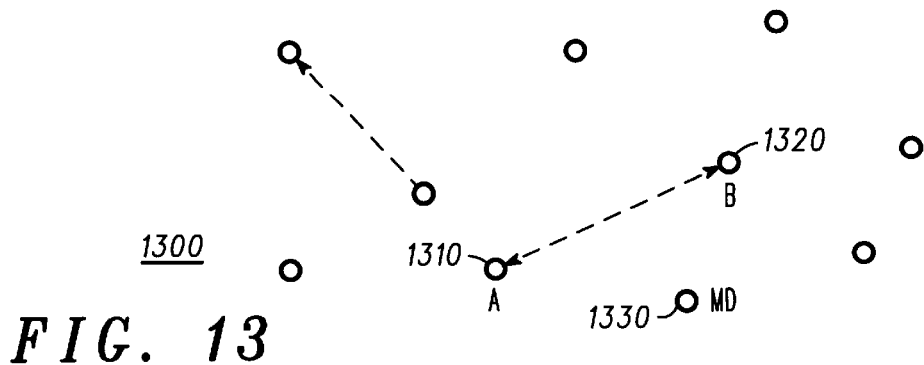
FIG. 13 is a network containing multiple low power devices and an additional low power device functioning as a MD, according to a second embodiment of the present invention.

Instead of using dedicated MD 930, the functionality of a MD may be coupled to each of the plethora 440 of low power communication devices. Referring now to FIG. 13, a network 1300 containing a plethora of low power communication devices is shown, according to a second embodiment of the present invention. Each low power communication device of the low power communication devices can function as MD. In FIG. 13, low power communication device 1330 is functioning as a MD. Note that low power communication device 1330 is not a dedicated MD 930. The low power communication device of the low power communication devices that will function as MD is selected at random.

There are several approaches that may be used to select the next MD. The MD could be selected at random when the low power communications device acting as MD is not able to act as MD any longer. If each MD uses a randomly generated initial phase offset t0, then the distribution of MD functionality across the low power communication devices within the network should be uniform. This selection process will prevent collisions between two low power communications devices attempting to concurrently act as MD, but it requires coordination amongst the low power communication devices within the network. A second approach, and the one used in the second preferred embodiment, is to let each low power wireless device randomly determine when it will act as MD. In the case of two low power communication devices acting as MD, a collision avoidance strategy will be used to ensure only one MD is within communication range of a low power communication device.

Figure 14:
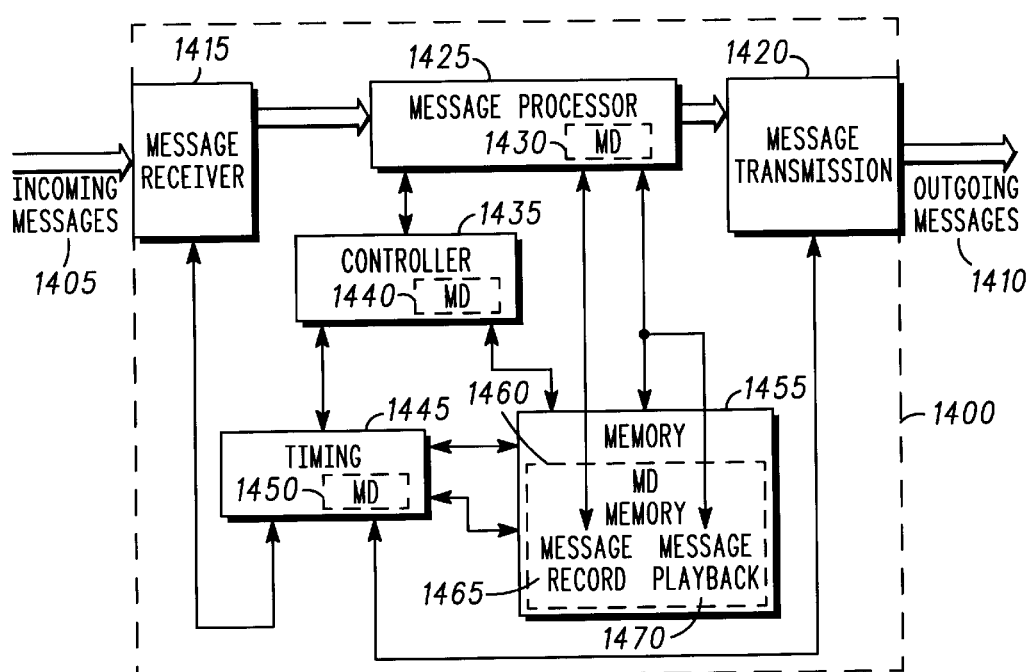
FIG. 14 is the internal functionality of a low power device operable as a MD, according to the second embodiment of the present invention.

Referring now to FIG. 14, a system level block diagram 1400 of the internal operation of a low power communication device with MD functionality is shown according to the second embodiment of the invention. The low power communication device 1400 is capable of supporting specialized functionality for sending and receiving several types of MD messages, including the source communication device id, the destination communication device id, the message, time of desired communication, message replay requests, control words, and device status messages. This specialized functionality is in addition to the normal operational mode representative of the plethora of low power communication devices in the network. Incoming messages 1410 are received by message receiver 1415 of communication device 1400, and are prepared for processing by message processor 1425. Message processor 1425 contains further MD processing functionality 1430 that interacts with the MD functionality of a MD controller 1440, MD timing 1450, and MD memory 1460 in order to allow the communication device 1400 to receive, store, replay and process incoming messages 1405 from other communication devices in the network while acting as MD. Note that the communication device 1400 also contains the functionality illustrated in FIG. 5, but with additional MD functionality shown in dashed boxes. The MD memory 1460 of storage block 1455 also includes message playback 1470 and message record 1465 memory, so that MD processor 1430 can mediate requests from communication devices within the network to record messages, playback messages, and save communication device contact information. The MD timing block 1450 allows for synchronization between the communication device 1400 and other communication devices in the network, when communication device 1400 is acting as MD. Device transmitter 1420 receives messages from device processor 1425, prepares messages for transmission, and transmits outgoing messages 1410 to other communication devices in the network. One skilled in the art will recognize that the functional blocks illustrated in the system level block diagram 1400 of FIG. 14 may be modified or combined without departing from the spirit and scope of a low power communication device that sends messages, receives messages, and processes messages. In particular, it should be noted that the MD functionality shown in FIG. 14 may be further combined or isolated from the non-MD operation of communication device 1400, so long as the device 1400 is operable as a MD to the network.

Figure 15:
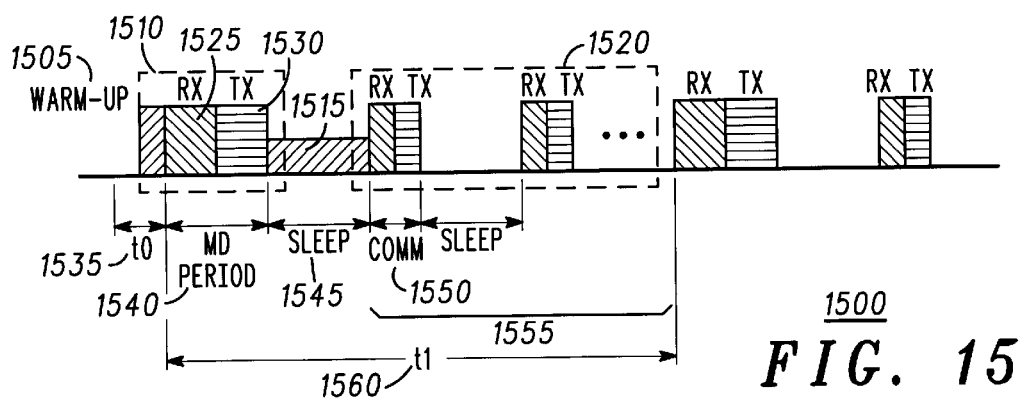
FIG. 15 illustrates a low communication duty cycle frame structure for a low power device functioning as a MD, according to the second embodiment of the present invention.

Referring now to FIG. 15, a representative low communication duty cycle frame structure 1500 of low power communication device 1400 functioning as MD is shown. Low communication duty cycle frame structure 1500 contains several cycles of operation in which each cycle contains a plethora of frames that are repeated multiple times. A first frame of the plethora of frames of low communication duty cycle frame structure 1500 contains a random delay t0 block 1535, a warm-up block 1505, and a communication block 1510. The random delay has duration t0 1535, where t0 is between 0 and the duration of a single transmit or receive period. This delay randomizes the start time of the communication devices in the network, so that the probability of multiple devices to function as MD concurrently is reduced. Warm-up block 1505 occurs next chronologically, and is a very small percentage of the overall frame duration. Warm-up block 1505 is followed by communication block 1510. Note that communication block 1510 and warm-up block 1505 directly follow the random delay t0 1535. However, it is also feasible for communication block 1510 and warm-up block 1505 to be delayed a random amount during the start of the next cycle of operation. In other words, the timing of communication block 1510 within the sequence of cycles is not constrained to be periodic. Communication block 1510 is a large percentage of the overall frame duration, and further comprises a receive slot 1525 and a transmission slot 1530. In the second preferred embodiment, the one receive slot 1525 precedes the one transmit slot 1530, although the order could be switched. Also, one of ordinary skill in the art will recognize that communication block 1510 could contain several transmit and receive slots in various arrangements. Also, although transmit slot 1530 occurs directly before or directly after receive slot 1525, the hardware contained in the transmitter and receiver will require some time to switch between the transmit and receive modes. The duration of the switching time can be dependent on the switching speed of the hardware in the communication devices, or it could be determined by a user specified parameter in the communication device processor.

After communication block 1510 ends, a second frame having a duration roughly one half of communication block 1510 begins. Second frame contains one sleep block 1515. Sleep block 1515 is a very high percentage of the overall frame duration. At the end of the second frame the low power communication device 1400 resumes low communication duty cycle operation starting with a third frame of the plethora of frames. The low communication duty cycle frame structure 1500 is shown in FIG. 6. Low communication duty cycle operation occurs for several frames of the plethora of frames of low communication duty cycle frame structure 1500. The duration of the first cycle of low communication duty cycle frame structure 1500 is a random number that is generated by the communication device 1400 at the start of the delay block 1535.

At the conclusion of the first cycle, the entire framing sequence just described is repeated until low power communication device 1400 stops functioning as MD. The decision to stop functioning as MD is made solely by the low power communication device 1400 in the second preferred embodiment, although it is also possible to coordinate the role of MD among several low power communication devices. Note that low power communication device 1400 contains the ability to generate and store random or pseudo-random numbers. These numbers could be generated by MD processor 1430, and stored in MD memory 1460.

Figure 16:
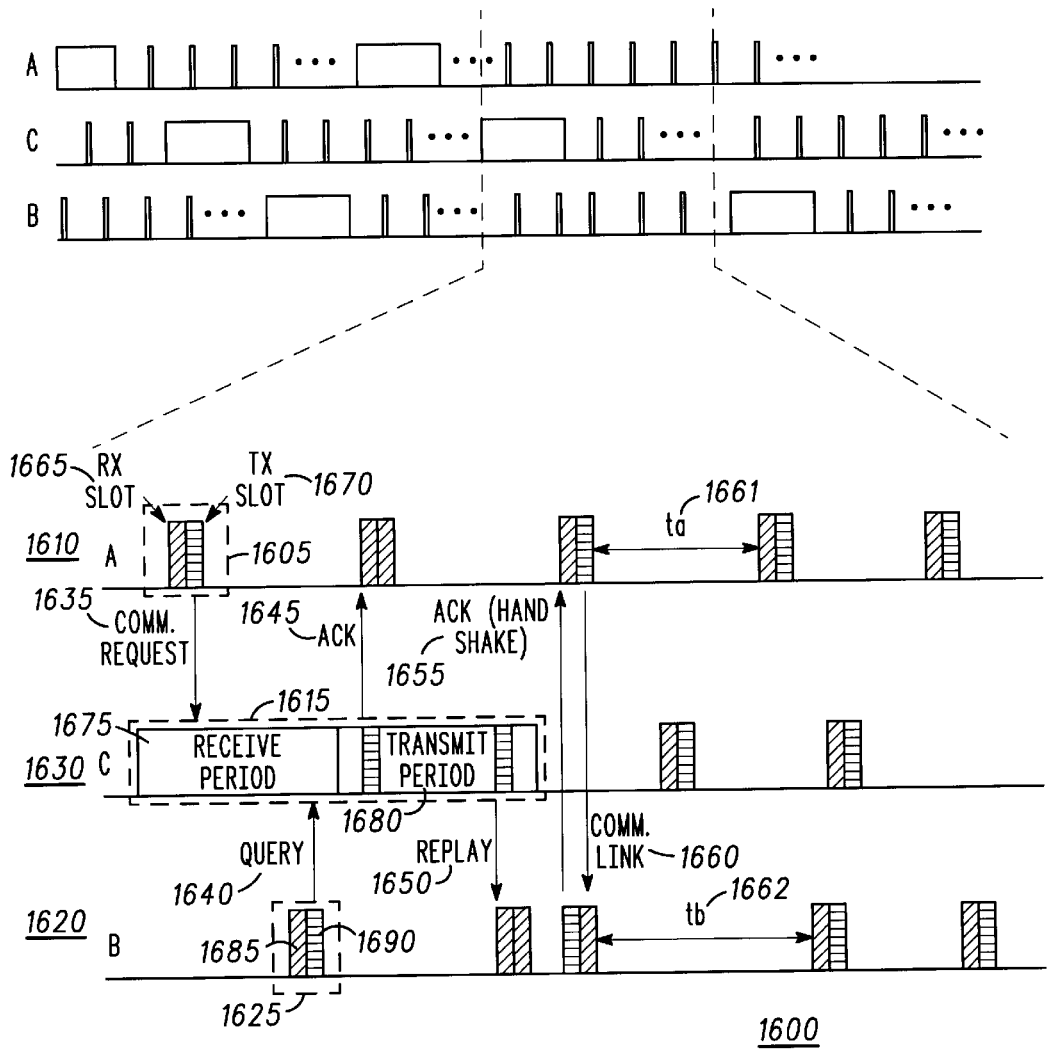
FIG. 16 is a timing diagram for communication between two low power devices and a third low power device acting as MD when the query occurs later than the communication request, according to the second embodiment of the present invention.
Figure 17:
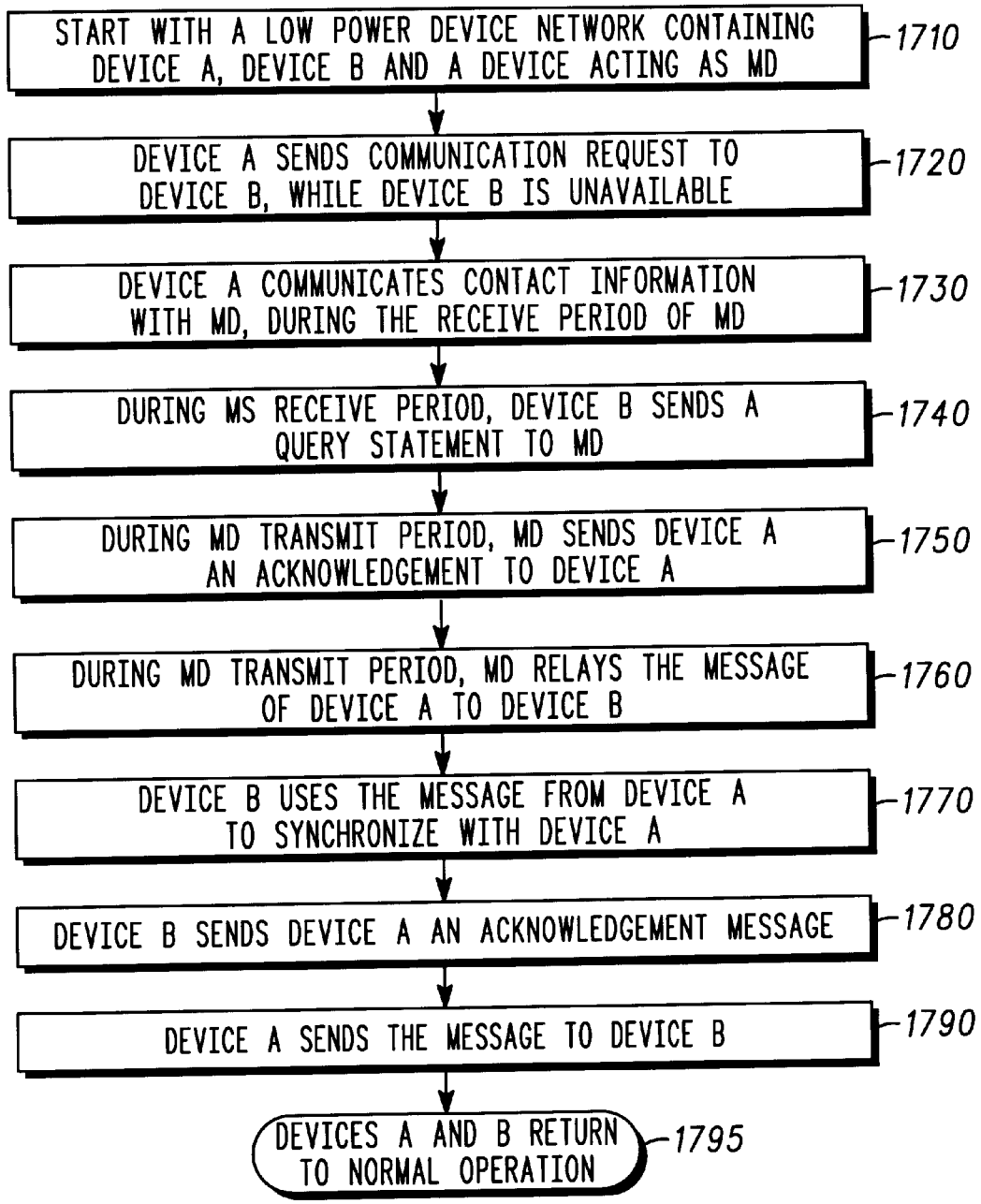
FIG. 17 is a flowchart of the communication between two low power devices and a third low power device acting as MD when the query occurs later than the communication request, according to the second embodiment of the present invention.

Referring now to FIG. 16, a detailed timing diagram for a device A 1610 attempting to send a communication request to a device B 1630 using a device C 1620 acting as MD, according to the second embodiment, is shown. As in FIG. 9, device A 1610 first attempts to communicate with device B 1630 prior to a query request 1660 of device B 1630. The communication sequence shown in FIG. 16 for the second embodiment is identical to the communication sequence shown in FIG. 9 for the first embodiment. A difference between the FIG. 9 and FIG. 16 is that device C 1630 is a low power communication device acting as MD. Device A 1610 is a low duty cycle device with a communication period containing a receive slot 1665 and a transmit slot 1670. Device B 1620 is also a low duty cycle device with a communication period containing receive slot 1685 and transmit slot 1690. Device C 1630 contains a communication period that is much longer than either communication period of device A 1610 or device B 1620. The communication period of device C 1630 similarly contains a receive period 1675 and a transmit period 1680. Referring also to FIG. 17, the flowchart for the timing diagram of FIG. 16 is shown. The flow in block 1730 of FIG. 17, as well as the timing diagram of FIG. 16, assume that device A 1610 has not been successful in communicating directly with device B 1620. So, there is a need for device A 1610 to use the device C 1630 to store a communication request with device B 1620. As shown in block 1730, device A 1610 sends a communication request 1635 to device C 1630 during the transmit slot 1670 of the communication period of device A 1610. Communication request 1635 is received by device C 1630 during the receive slot 1675 of the communication period of device C 1630. Also during the receive period 1675, device B 1620 enters its communication period. Upon waking, device B 1620 sends a query 1640 using transmit slot 1690 to device C 1630 to check for messages. Note that both device A 1610 and device B 1620 are able to communicate with device C 1630 during a single receive slot 1675. The duration of receive slot 1675 and transmit slot 1680 of device C 1630 should be chosen to be large enough that device C 1630 is able to receive both communication requests and query messages. Since MD 1630 received communication request 1635 from device A 1610 prior to the query 1640 from device B 1620, during the transmission slot 1680 of the communication period of device C 1630, device C 1630 first sends an acknowledgement 1645 to device A 1610 during receive slot 1665 in the next communication period of device A 1610, as indicated in block 1750. Device C 1630 then sends a replay message 1650 to device B during the same transmit slot 1680 of the communication period of device C 1630, as indicated in block 1760.

Device B 1620 now has enough information to enable communications with device A 1610 without the use of device C 1630. In order to synchronize with device A, device B uses timing information provided in the communication request 1635 of device A 1610, and swaps communication slots so that the transmit slot 1690 precedes the receive slot 1685 of device B 1620. As shown in block 1780, device B 1620 then sends an acknowledgement 1655 to device A during the receive slot 1665 of the communication period of device A. As shown in block 1790, device A 1610 is now able to communicate a message 1660 to device B 1620 during the transmit slot 1670 of device A 1610 and the receive slot 1685 of device B 1620. Once the communication between device A 1610 and device B 1620 is complete, device A 1610 sleeps for a randomly generated duration ta 1661 and device B 1620 sleeps for a randomly generated duration tb 1662. Device A 1610 and device B 1620 then return to normal operation, as shown in block 1795.

Figure 18:
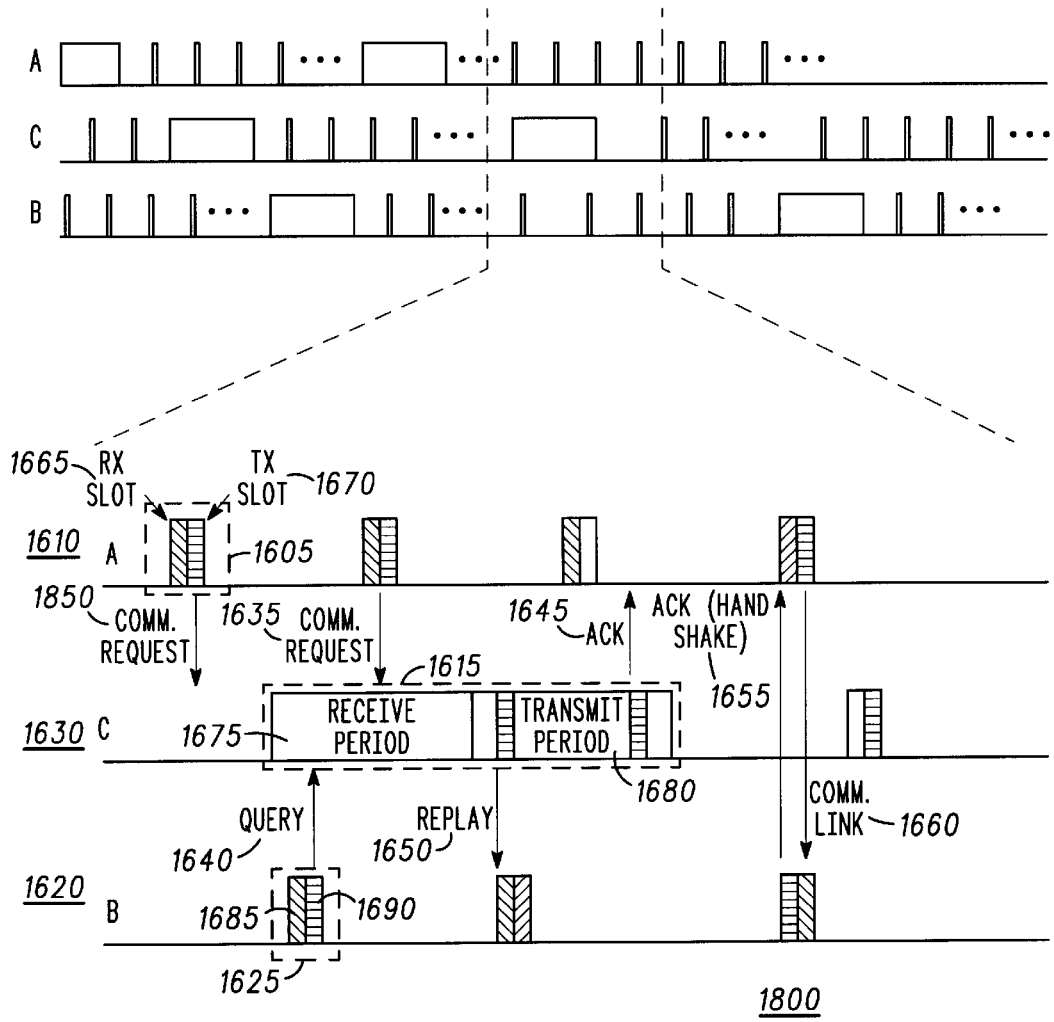
FIG. 18 is a timing diagram for communication between two low power devices and a third low power device acting as MD when the query occurs earlier than the communication request, according to the second embodiment of the present invention.
Figure 19:
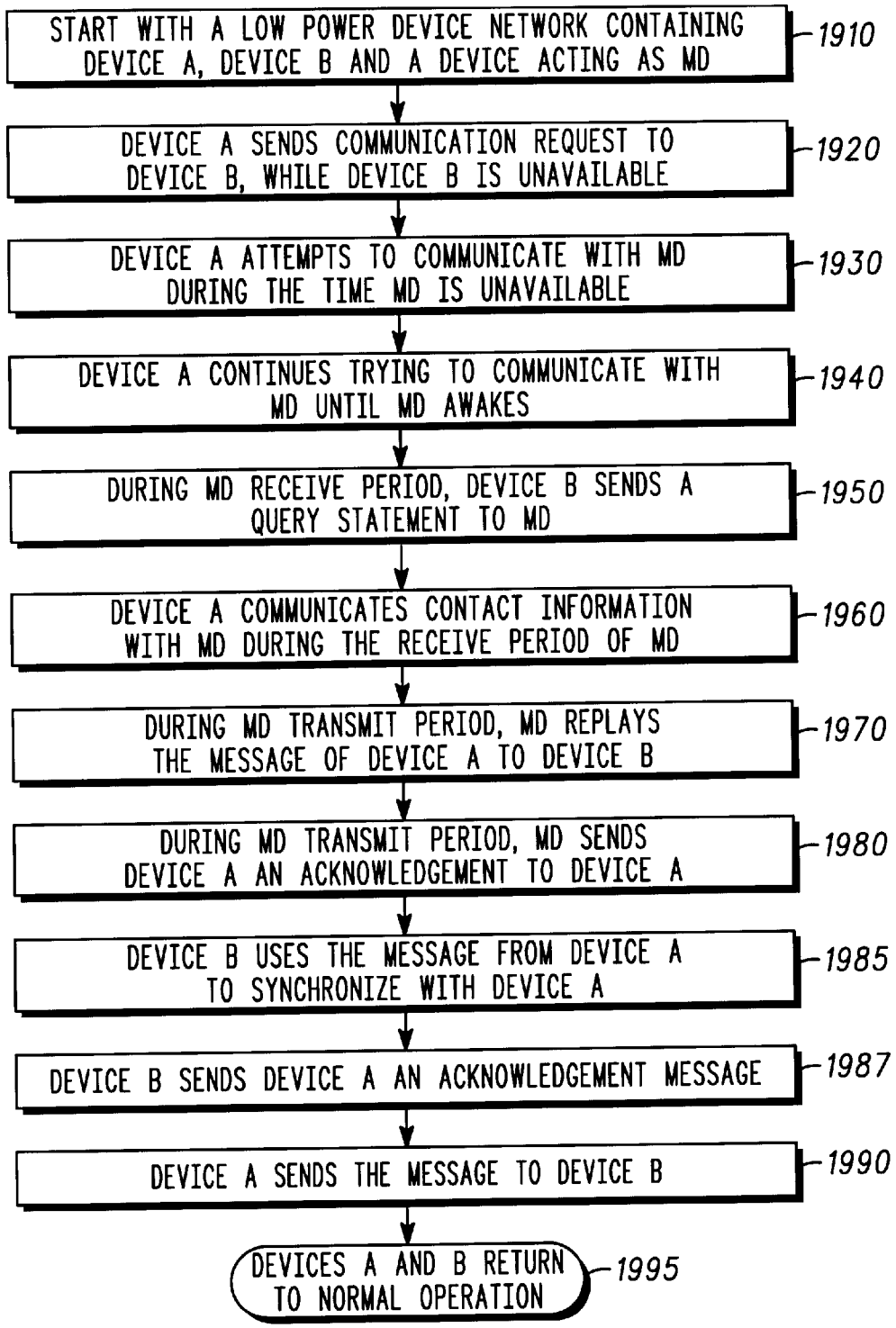
FIG. 19 is a flowchart for the communication between two low power devices and a third low power device acting as MD when the query occurs earlier than the communication request, according to the second embodiment of the present invention.

The discussion above referring to FIG. 16 and FIG. 17, illustrated the sequence of communication operations and timing flow for the case in which the query from device B 1620 is later than the communication request from device A 1610, according to the second embodiment. It is also possible for the query of device B 1620 to precede the communication request of device A 1610. This scenario is illustrated in the timing diagram of FIG. 18, and the flowchart of FIG. 19. The sequence of operations shown in FIG. 18 is similar to those in FIG. 11, except that device C 1630 is a low power communication device functioning as a MD, rather than the dedicated MD 930 shown in FIG. 11. Since the device C 1630 is not available, the first communication request 1850 of device A 1610 is not received as shown in block 1930, and device A 1610 has to wait until a communication period in which device C 1630 has an active receive period 1675, as shown in block 1940. This delay means that device B 1620 sends query 1640 to the receive slot 1675 of device C 1630 prior to the communication request 1635 of device A 1610, as in block 1950. It is important to note that since both the transmit slot 1675 and receive slot 1680 of device C 1630 are as long as two transmit periods of device A 1610 or device B 1620, during the transmit slot of device C 1630, device C is able to replay message 1650 to device B 1620 and acknowledge 1645 device A 1610. This allows the handshake between device A 1610 and device B 1620 to proceed as in block 1985-1990. So, the ordering of the communication request 1635 and the query 1640 within a single receive slot 1675 and the ordering of replay 1650 and acknowledgement 1645 within a single transmit slot 1680 of device C 1630 does not affect establishment of communications between device A 1610 and device B 1620. Once the communication between device A 1610 and device B 1620 is complete, device A 1610 sleeps for a randomly generated duration ta 1661 and device B 1620 sleeps for a randomly generated duration tb 1662.

Figure 20:
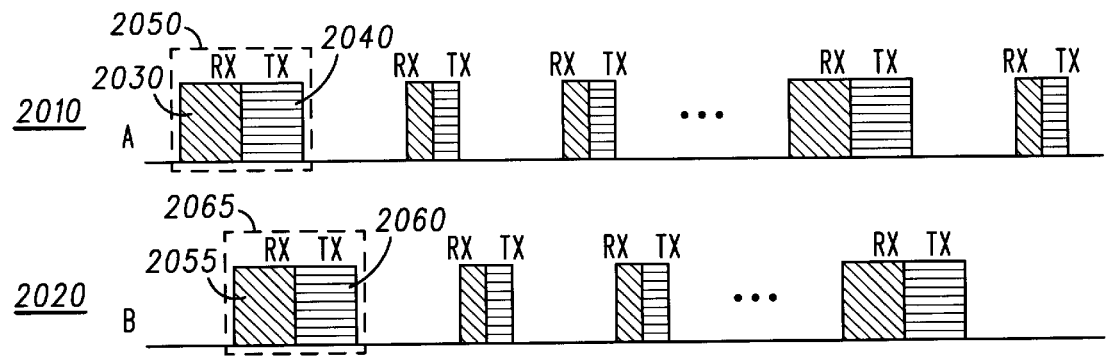
FIG. 20 is a timing diagram illustrating a collision between two low power devices acting as MD when a collision avoidance strategy is not used, according to the second embodiment of the present invention.

For the second embodiment of the present invention, it is possible for two communication devices within the network to independently decide to function as MD's at the same time. If this occurs, then it is possible that the transmit periods of the two devices of the two devices overlap and a collision results. This situation is illustrated in FIG. 20. Device A 2010 first starts to function as MD. A short time later, a second device B starts to function as MD. When transmission slot 2040 of device A 2010 overlaps transmission slot 2060 of device B 2020, the two transmitters interfere and communications capability is degraded. Note that the issue of collision is only a problem when the transmitters in the communication devices within the network occupy overlapping frequency bands and the communicated bit rate/bandwidth is high. If the transmitter data is modulated using a spreading waveform, then the communication devices could occupy the same frequency band and collisions could be less of an issue. According to the preferred second embodiment, each of the communication devices are single-channel devices using the same transmission frequency, so that the collision issue must be addressed.

Figure 21:
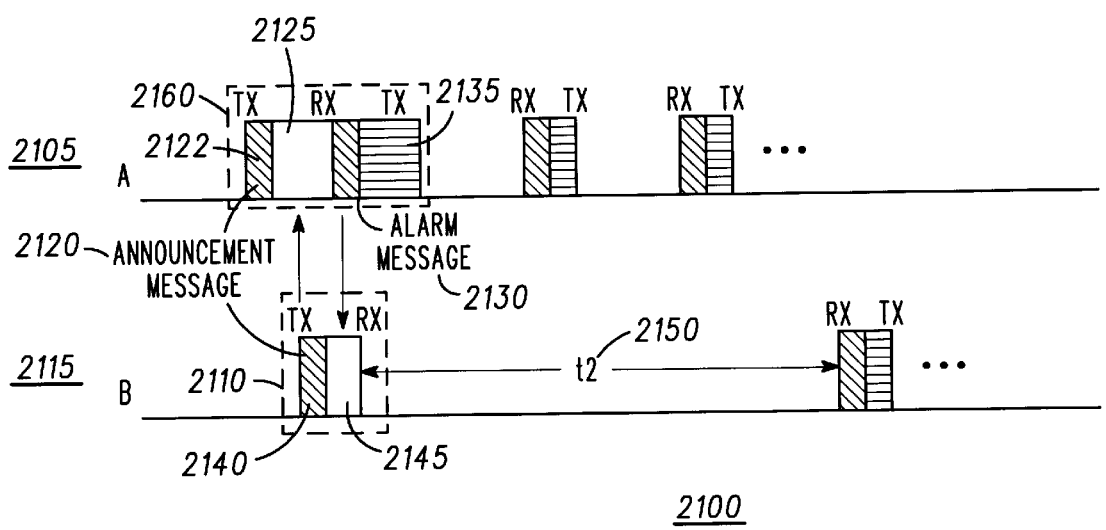
FIG. 21 is a timing diagram illustrating the collision avoidance strategy between two low power devices acting as MD, according to the second embodiment of the present invention.
Figure 22:
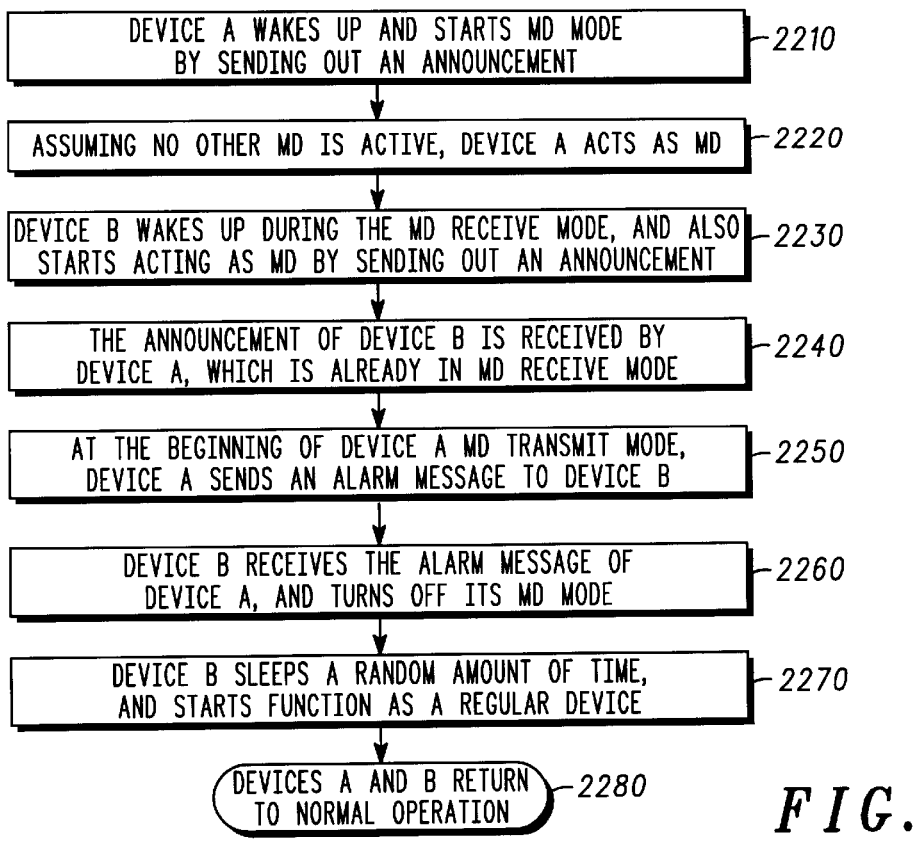
FIG. 22 is the collision avoidance strategy flowchart, according to the second embodiment of the present invention.

Referring now to the timing diagram of FIG. 21, and the flowchart of FIG. 22, a collision avoidance strategy is described according to the second embodiment of the present invention. Device A 2105 is randomly selected as MD prior to device B 2115. At the start of the MD mode of device A 2105, device A transmits announcement message 2120 (block 2210) in a very short duration transmission slot 2122, and then switches to receive slot 2125 of communication period 2160 (block 2220). Device B 2115 is then randomly selected as MD, and device B 2115 sends out announcement message 2120 (block 2230) in a very short duration transmission slot 2140 prior to switching to receive slot 2145 of communication period 2160. Device A receives the announcement message 2120 of device B 2115 (block 2240) during receive slot 2125, and generates alarm message 2130 during it's next transmit period 2135 (block 2250). Device B 2115 receives this alarm message 2130 during receive period 2145, and immediately stops acting as MD (block 2260). Device B 2115 then sleeps a random amount of time t2 to prevent future collisions and resumes operation as a normal low power communication device (block 2270). Instead of sleeping for t2 seconds, device B 2115 could wait until the end of the MD communication period of device A 2105. At this time, device B 2115 functions as a MD, since device A 2105 is not in communication period 2160.

According to the second preferred embodiment, the random initial offset t0 1535 is between 0 and 1 sleep period 1545, the amount of delay ta 1661 and tb 1662 are between 0 and 1 sleep period 1515, and the cycle time t1 1560 follows the inequality, $0.5T<t1<1.5T$, where T is the average frequency of the communication period of a communication device acting as MD.

The second embodiment of the present invention presents a protocol and structure for a network of low power communication devices to improve the reliability of inter-device communication through the use of a Mediation Device (MD). One issue with this approach is the reliability when the number of communication devices in the network is small. As an example, if the network contains only five communication devices, and the MD communication cycle of each is 1000 seconds (t1), then the average latency will be roughly 200 seconds. One way to reduce the latency is to constrain all nodes to communicate within a specified time window.

Figure 23:
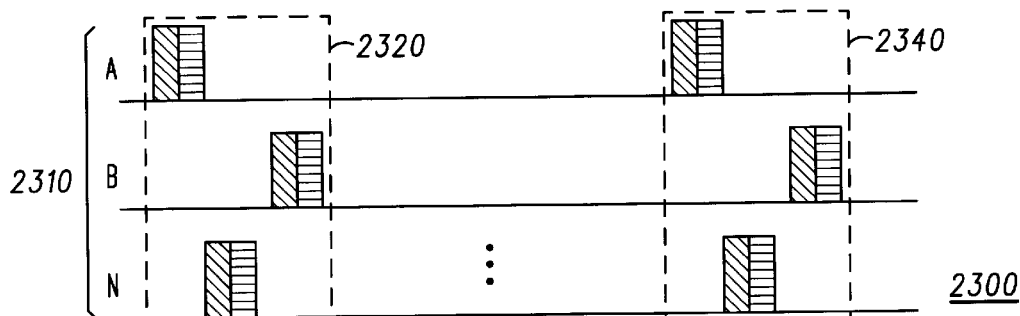
FIG. 23 is a timing diagram for a multiple access scheme for a small network of low power devices, wherein each device is operable as a MD, according to a third embodiment of the present invention.

Referring to FIG. 23, a multiple access scheme in which N communication devices 2310 are in the network, according to a third embodiment of the present invention. Each communication device of the N communication devices is constrained to receive and transmit information within a window 2320 of duration Tw seconds. Duration Tw is selected from the size of the network as determined by the number of communication devices in the network.

For example, for a network with five communication devices operating within a t1 period of 1000 seconds, the average latency is 200 seconds. If the communication cycle t1 is reduced to 300 seconds, the average latency is reduced by a factor of three. If the duration Tw of window 2320 is smaller than the communication period of the communication device, the duration of the communication period must be reduced to fit within window 2320. Reducing the duration of the communication period increases the likelihood of communication devices moving out of communication range without the knowledge of communication device acting as MD. Also, new communication devices entering the network will not be recognized unless their communication period lies within the window 2320.

Figure 24:
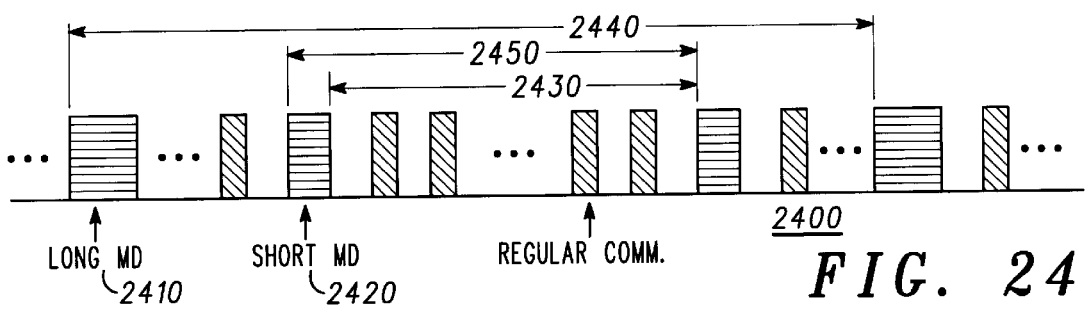
FIG. 24 is a low communication duty cycle frame structure for a multiple access scheme for a small network of low power devices, wherein each device is operable as a MD, according to the third embodiment of the present invention.

One solution to this is illustrated in FIG. 24, according to the third embodiment of the present invention. The timing diagram 2400 of FIG. 24 shows a communication device which has a shortened communication period so that the communication device is able to communicate within window 2420. In order to check for new communication devices, or recognize the loss of existing communication devices, a long communication period 2410 is occasionally used when the communication device is acting as MD. This long communication period 2410 is followed by the low power communication duty cycle 2430 structure of FIG. 6, and additional short MD communication periods 2420. With the exception of the long communication periods 2410, the communication device has essentially the same low communication duty cycle frame structure illustrated in FIG. 15 of the second embodiment.

As an example of the third embodiment, a long communication period 2410 of 2 seconds, a short communication period 2420 of 200 ms, and the normal low communication duty cycle mode with a communication period of 2 ms is used. The frequency of the long communication period 2410 is 1500 seconds, the frequency of the short communication period is 300 seconds, and the frequency of the normal communication period is 1 second. This leads to a duty cycle of about 0.4%.

It is noted that the communication device described herein may be a NeuRFon® device or any suitable communication device having similar operating characteristics.

While the invention has been particularly shown and described with reference to a preferred embodiment, it will be understood by those skilled in the art that various changes in form and detail may be made therein without departing from the spirit and scope of the invention. For example, one of ordinary skill in the art will recognize that low power devices may by physically connected or wireless, without departing from the spirit and scope of the invention. In the first, second, and third preferred embodiments, single-channel communication devices are contained in each of the first, second and third preferred embodiments. Also, for each preferred embodiment, the transmit slot and receive slot of a communication device of the plurality of communication devices do not overlap. For all three embodiments, the duty cycle is defined as the fraction of time that the communication device is in either a transmit slot or a receive slot. Also for all three embodiments, the communication device is assumed to be a low communication duty cycle, low power, wireless device, but, again, this need not be the case.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A first communication device of a plurality of communication devices operable to mediate communications between the plurality of communication devices in an asynchronous network, comprising:

a processing element;

a receiver, coupled to and controlled by the processing element, that receives during a mediation communication period of the first communication device a communication request from a second communication device of the plurality of communication devices when a message transmitted by the second communication device is not received by a third communication device of the plurality of communication devices, wherein the communication request comprises contact information from the second communication device useful for facilitating communication between the second and third communication devices;

a transmitter, coupled to the processing element, that in response to the receiver receiving a query from the third communication device transmits the contact information to the third communication device;

wherein the first communication device operates to mediate communications between the second and third communication devices during the mediation communication period in a mediation mode and does not operate to mediate communications between the second and third communication devices in a normal operating mode; and wherein the processing element of the first communication device randomly sets a duration of a communication cycle of a plurality of communication cycles comprising the mediation communication period during the mediation mode, and a plurality of normal communication periods and a plurality of sleep periods during the normal operating mode.

2. The device of claim 1, wherein the plurality of normal communication periods are separated by the plurality of sleep periods.

3. The device of claim 1, wherein a duration of each of the plurality of communication cycles is randomly set by the processing element.

4. A method of a first communication device mediating communications between second and third communication devices of a plurality of communication devices of an asynchronous network, comprising:

randomly setting a duration of a communication cycle of a plurality of communication cycles of the first communication device comprising a mediation communication period during a mediation mode of the first communication device and a plurality of normal communication periods and a plurality of sleep periods during a normal operating mode of the first communication device;

the first communication device receiving a communication request, during a receive portion of the mediation communication period representative that a message sent by a second communication device was not received by the third communication device, wherein the communication request comprises contact information useful for facilitating communication between the second and third communication devices;

in response to receiving the communication request, the first communication device transmitting an acknowledge message;

the first communication device receiving a query about whether messages intended for the third communication device have been missed; and in response to receiving the query, the first communication device transmitting a replay message containing the contact information.

5. The method of claim 4, wherein the duration of the communication cycle is randomly set by a processing element of the first communication device.

6. The method of claim 4, wherein the plurality of normal communication periods are separated by the plurality of sleep periods.

7. The method of claim 4, wherein a duration of each of the plurality of communication cycles is randomly set by the processing element.

8. The method of claim 4, further comprising:

upon the first communication device powering-up, randomly setting an initial timing offset of the first communication device.

9. The method of claim 8, wherein the initial timing offset is set with respect to a clock phase of the first communication device.

10. The method of claim 4, further comprising:

the first communication device transmitting an announcement message at the beginning of the mediation communication period.

11. The method of claim 4, further comprising:

if the first communication device receives an announcement message during the mediation communication period, the first communication device transmitting an alarm message in response.

12. An asynchronous communications network, comprising:

a plurality of communications devices each having a plurality of communication cycles and each operable to mediate communications between the plurality of communication devices during a mediation communication period in a mediation mode and each not operable to mediate communications between the plurality of communication devices in a normal operating mode, wherein each communication cycle of the plurality of communication cycles comprises a mediation communication period during the mediation mode and a plurality of normal communication periods and a plurality of sleep periods during the normal operating mode;

wherein upon entering the mediation mode, a first communication device of the plurality of communication devices randomly sets a duration of a first communication cycle of the plurality of communication cycles of the first communication device and transmits an announcement message at the beginning of the mediation communication period of the first communication cycle in the mediation mode;

wherein if a message transmitted by a second communication device of the plurality of communication devices is not received by a third communication device of the plurality of communication devices the second communication device transmits a communication request to the first communication device, the first communication device in response to the communication request transmits an acknowledge message to the second communication device, the third communication device upon waking from a sleep period transmits a query to the first communication device, in response to the query the first communication device transmits to the third communication device a replay message containing contact information that facilitates communication between the second and third communication devices, and during a synchronized communication period in which communication of the second and third communication devices is synchronized the second communication device transmits the message to the third communication device.

13. The network of claim 12, wherein after the synchronized communication period a duration of a subsequent communication cycle of the second communication device is randomly set and a duration of a subsequent communication cycle of the third communication device is randomly set.

14. The network of claim 12, wherein in response to a fourth communication device of the plurality of communication devices receiving the announcement message during a second communication cycle of the fourth communication device, the fourth communication device transmitting an alarm message during a transmission portion of the mediation communication period of the fourth communication device that causes the first communication device to delay transmission during the mediation communication period of the first communication device until after the fourth communication device has completed transmission.

15. The network of claim 12, wherein upon the first communication device powering-up, an initial timing offset of the first communication device is randomly set.

16. The network of claim 15, wherein the initial timing offset is set with respect to a clock phase of the first communication device.

17. The network of claim 12, wherein the plurality of normal communication periods are separated by the plurality of sleep periods.

18. The network of claim 12, wherein a duration of each of the plurality of communication cycles is randomly set by a processing element of the first communication device.

19. The network of claim 12, wherein the mediation communication period of the communication cycle of each of the communication devices of the plurality of communication devices are within Tw seconds of one another.

20. The network of claim 19, wherein the duration of Tw is determined by the number of communication devices of the plurality of communication devices in the asynchronous network.

21. The network of claim 12, wherein each mediation communication period of one or more communication devices of the plurality of communication devices comprises a plurality of mediation communication sub-periods of varying duration periodically arranged during one or more corresponding communication cycles.

22. A method of mediating communications between a plurality of communication devices of an asynchronous communications network, comprising:

upon entering a mediation mode, a first communication device of the plurality of communication devices randomly setting a duration of a first communication cycle of a plurality of communication cycles of the first communication device and transmitting an announcement message at the beginning of a mediation communication period of the mediation mode of the first communication device;

if a message transmitted by a second communication device of the plurality of communication devices is not received by a third communication device of the plurality of communication devices, the second communication device transmitting a communication request to the first communication device during the mediation communication period of the first communication device;

in response to receiving the communication request, the first communication device transmitting an acknowledge message to the second communication device during the mediation communication period of the first communication device;

the third communication device upon waking from a sleep period transmitting a query to the first communication device;

in response to the query the first communication device transmitting to the third communication device a replay message containing contact information that facilitates communication between the second and third communication devices; and during a synchronized communication period in which communication of the second and third communication devices is synchronized, the second communication device transmitting the message to the third communication device.

23. The method of claim 22, further comprising:

in response to a fourth communication device of the plurality of communication devices receiving the announcement message during a second communication cycle of the fourth communication device, the fourth communication device transmitting an alarm message during a transmission portion of the mediation communication period of the fourth communication device that causes the first communication device to delay transmission during the mediation communication period of the first communication device until after the fourth communication device has completed transmission.

* * * * *